March 22, 1960 G. VON WRANAU ET AL 2,929,675
METHOD FOR SPINNING GLASS FIBERS
Filed March 23, 1954 2 Sheets-Sheet 1
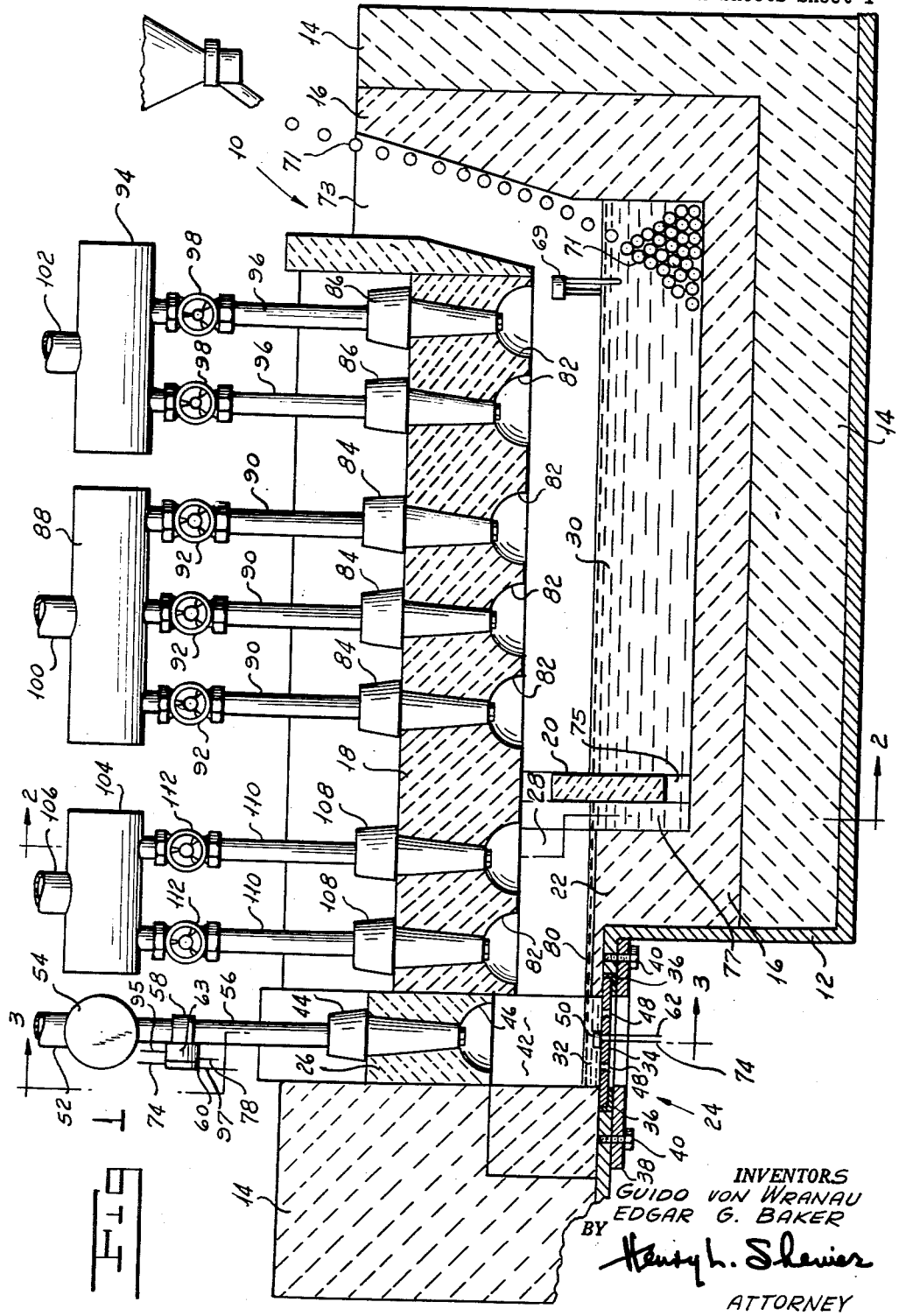
INVENTORS
GUIDO VON WRANAU
EDGAR G. BAKER
BY Henry L. Shevier
ATTORNEY

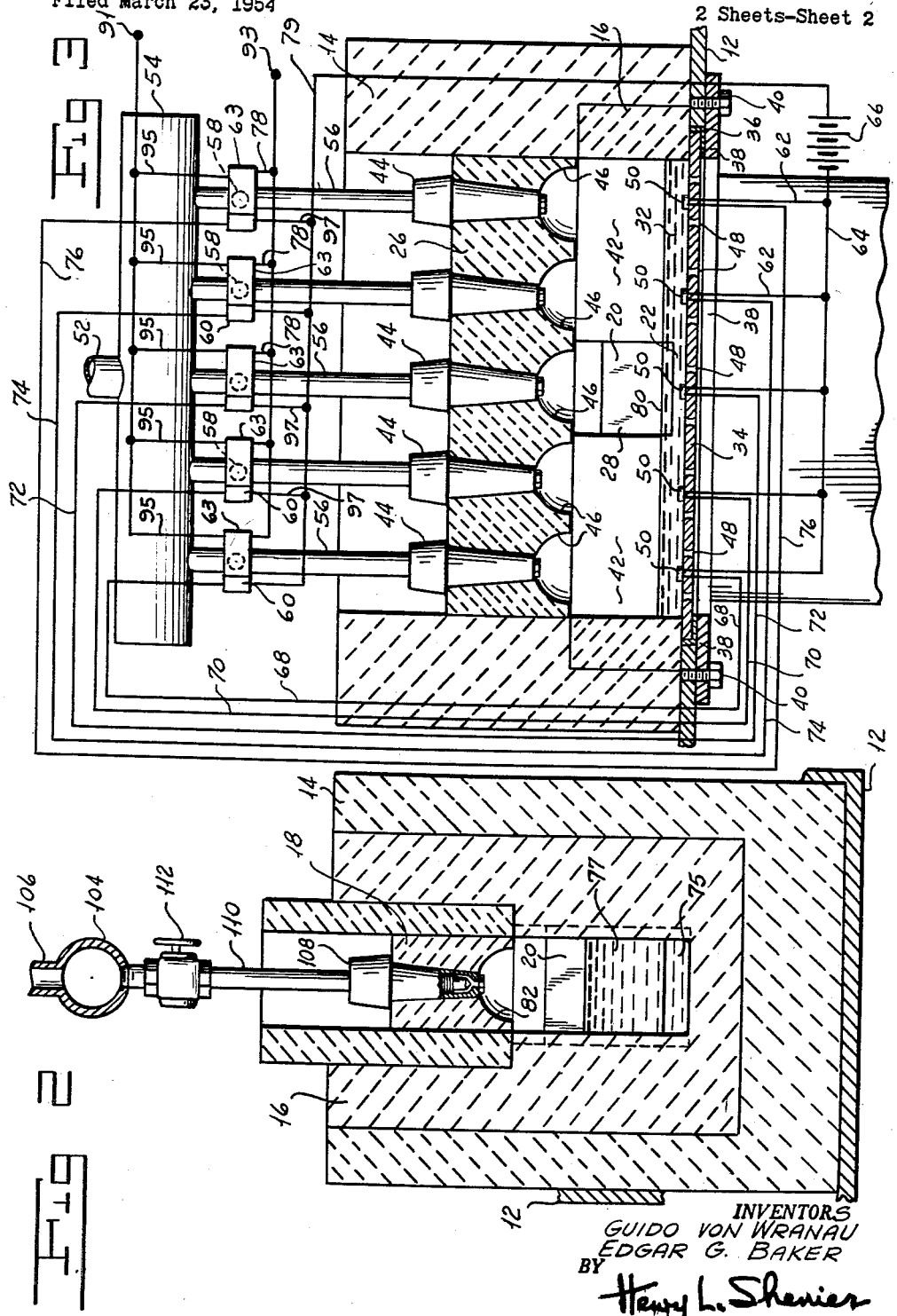

United States Patent Office 2,929,675
Patented Mar. 22, 1960

2,929,675

METHOD FOR SPINNING GLASS FIBERS

Guido von Wranau and Edgar G. Baker, Carbondale, Pa., assignors to Gentex Corporation, New York, N.Y., a corporation of Delaware Application March 23, 1954, Serial No. 418,088

1 Claim. (Cl. 18—54)

Our invention relates to a method for spinning glass fibers and more particularly to a new and improved method of controlling the fiber diameter of glass fibers.

In the prior art of spinning glass fibers, glass is melted either electrically or by heat from gas flames. The molten glass is allowed to flow to a spinning box heated electrically either by induction or resistance heating.

In the copending application of Guido von Wranau, Serial No. 144,874, filed February 18, 1950, now abandoned, there is shown apparatus for the manufacture of glass filaments in which glass is melted by radiant heat. In this application, however, the spinning box itself is heated electrically in accordance with the prior art.

Electrical heating requires a high-cost installation and is expensive to operate owing to the high cost of electricity and the inefficiency of employing electricity to heat as compared with other more direct heating methods. Furthermore, the control of the temperature necessitates complicated equipment and this is necessary to the success of the spinning operation. Those in the art recognize that it is of critical and vital importance to maintain a level temperature of the glass in the spinnerette. A comparatively minor temperature variation, say five degrees, of the spinnerette frequently leads to fiber breakage. Furthermore, a higher temperature means a more fluid molten glass. This, in turn, means filaments of a diameter larger than desired. A lower temperature, not sufficiently low to lead to breakage, still increases the viscosity of the molten glass and results in filaments which are too thin or small in diameter. It is assumed, of course, that the speed of attenuation of the composition of the glass is constant during a run.

The necessity of closely controlling the spinnerette temperature in the manufacture of glass fibers has resulted in limiting the size of the spinning boxes. The dependence on electric heating, furthermore, has to a large extent dictated the shape of the spinning box and limited its length. A typical electrically heated spinnerette, for example, could not conveniently exceed a length of ten inches. The necessity of evenly distributing the heating current dictates a substantially rectangular shape for the spinning boxes of the prior art.

One object of our invention is to provide a new method of maintaining the spinnerette temperature in the production of glass filaments.

Another object of our invention is to provide a novel method of heating spinnerettes in the production of glass fibers.

A further object of our invention is to provide an improved method of heating spinnerettes in the production of glass fibers whereby a spinnerette of any convenient or desired size, shape or length may be employed.

A further object of our invention is to provide an improved method of spinning glass fibers in which fibers of a more uniform diameter can be conveniently produced.

Other and further objects of our invention will appear from the following description.

In general our invention contemplates the provision of a spinning box of comparatively small depth and the maintenance of the molten glass in molten condition in the spinning box by means of radiant heat. The spinning box is in communication with and constantly fed molten glass from a glass melting furnace or pot with which the spinning box portion forms a novel combination. Means are provided for maintaining the molten glass at a constant level. The depth of the molten glass layer covering the spinnerette will depend upon the transmission properties of the glass. We contemplate decolorizing glass to make it more translucent so that infra-red rays of the radiant heat may readily pass through the glass for heating the spinnerette. The radiant heat is furnished from gas burners which are closely controlled by means of thermocouples positioned in the spinning box. We contemplate adjusting the glass level in accordance with the transmission properties of the particular glass being used. No electrical heating means of any kind or character need be employed and, accordingly, we may make our spinning box or spinnerette of any desired size or shape. We may employ a very long spinning box fed from a single glass melting furnace and yet achieve a very close control of the temperature of the spinnerette.

In the accompanying drawings which form part of the instant specification and which are to be read in conjunction therewith and in which like reference numerals are used to indicate like parts in the various views:

Figure 1 is a diagrammatic sectional elevation of a glass melting furnace and spinnerette showing one form of apparatus capable of carrying out the process of our invention.

Figure 2 is a sectional view taken along the line 2—2 of Figure 1.

Figure 3 is a sectional view taken on the line 3—3 of Figure 1 showing the thermocouple controlled temperature controlling system.

More particularly referring now to the drawings, the glass melting portion of our assembly, indicated generally by the reference numeral 10, comprises a shell 12 made of steel plate or the like containing a first lining 14 of convenient refractory material, such as fire-brick or the like. This first refractory material 14 supports an inner lining 16 made of very highly refractory material adapted to conveniently retain molten glass.

Not only is the inner lining 16 made of a highly refined, highly refractory material but we also make the roof 18 and a bridge wall 20 of the highly refractory material. The left-hand end wall 22 of the glass melting portion, as viewed in Figure 1, acts as a weir over which the molten glass flows to the spinning section indicated generally by the reference numeral 24. The spinning section 24 is provided with its own roof 26 formed of highly refractory material. The spinning box extends transversely of the duct 28 which provides communication between the body of molten glass 30 in the glass melting section 10 and the thin layer of molten glass 32 which lies over the spinnerette 34. The spinnerette 34 is supported immediately by a layer of refractory cement 36 which is, in turn, contained by an annular plate 38 secured to the casing 12 by means of machine screws 40. Along the length of the spinning box space 42 and in the roof 26 of the spinning box, we provide a plurality of gas burners 44. These burners 44 may advantageously take the form shown in Patent 2,215,079 to Frederic O. Hess, granted September 17, 1940. It will be seen that each of the burners rests in a re-entrant portion having a surface 46. These surfaces define a combustion space surrounding the respective tips of the burners 44. The surfaces 46 become highly incandescent under the impingement of flames being jetted against the surfaces and become excellent sources of radiant heat. The spinnerette 34 is provided with a plurality of apertures or orifices 48 along the length of the spinning box. The molten glass is drawn from these orifices to form glass filaments. The spinnerette 34 may be formed of any appropriate high-melting point material and may have any convenient cross-sectional shape or area owing to the advantages of our invention. By means of our invention the restriction of the length or shape of the spinnerette is removed. The orifices 48 may vary in diameter according to the type of glass used, the speed of attenuation and the desired fiber diameter. Advantageously these orifices may vary from .090 inch to .140 inch in diameter. Simultaneouly, the thickness of the spinnerette which determines the length of the orifices may vary. We are enabled to use somewhat larger orifice holes since it will be observed that we have a very small head of molten glass over our spinnerette. In practice the head of molten glass will very between one-eighth inch and one and one-half inches. The thin layer of molten glass over the spinnerette enables the spinnerette temperature to be readily controlled since there is a comparatively small depth of glass to absorb radiant heat. Advantageously, we decolorize our glass to make it very translucent. The natural color of the glass is greenish. We achieve decolorization by the addition of such materials as selenium oxide, manganese peroxide, copper oxide or dispersed gold. These materials are commonly added to glass in small quantities to decolorize them. In larger quantities they give glass a reddish hue.

Positioned within the molten glass and adjacent the spinnerette 34 we provide a plurality of thermocouples 50. A thermocouple is positioned under each radiant heat emitter 46. A combustible gas and air or other fuel and air mixture is supplied from a suitable source (not shown) through a pipe 52 to a fuel-air manifold 54. A separate branch pipe 56 controlled by a valve 58 furnishes the fuel to the burners 44. Each of the valves 58 is controlled by a solenoid operator 63. The adjustment of the valve 58 is such that in one position a small predetermined quantity of fuel-air mixture is fed to the burner. In another position of the valve a much larger quantity of fuel-air mixture is fed to the burner. The quantity of radiant heat generated by the burner is a function of the integrated times the valve is in each of its low-heat and high-heat positions. Referring now to Figure 3, each thermocouple 50 is connected to control a respective relay 60 for controlling a respective solenoid 63 which in turn controls a respective valve 58. It will be observed that each thermocouple 50 is connected to control a separate relay 60 in a circuit which may contain a booster battery 66. The solenoids are supplied current from a pair of voltage terminals 91 and 93. It will be observed that each of the solenoids is connected across the potential terminals by respective conductors 95 and 78. The circuit to each solenoid is controlled by the contacts of its respective relay 60. Each of the relays 60 is under the control of its respective thermocouple 50. One of each of the relay terminals is connected to common conductor 79 by a conductor 97. The conductor 79 may be connected to the common conductor 64 either directly or through a booster battery 66. The thermocouple produces a change in potential in the order of millivolts and this current may advantageously be amplified, if desired, as is well known in the art. The variation in voltage produced by the thermocouple is impressed across a respective relay winding. One terminal of the left-hand thermocouple 50 is connected to the left-hand relay 60 through conductor 68. The other relays are connected by respective conductors 70, 72, 74 and 76, as can readily be seen by reference to Figure 3, to one respective terminal of the other thermocouples. Each of the other terminals of respective thermocouples is connected by a conductor 62 to the common conductor 64. The arrangement is such that if the temperature below one of the burners becomes too high, its valve operator operates to reduce the fuel-air mixture supply by actuating the control valve to its low heating position. If the temperature below one of the radiant heat sources becomes too low, the valve operator is actuated to increase the flow of fuel-air mixture to the controlled burner by moving the valve to its high heating position. This control of the spinnerette temperature is highly critical and extremely important if uniform results are to be achieved. A temperature difference as small as five degrees, for example, at the spinnerette between one orifice and a separated orifice will lead to fiber breakage at the colder spots and larger fiber diameter at the hotter orifices. A lower temperature increases the viscosity and a higher temperature decreases the viscosity of the molten glass. In pulling the glass through the orifice, we have a very small body of glass enclosed by the orifice walls compared to the surrounding surface of the orifice. When one contemplates this physical relationship, one will readily understand why the temperature of the spinnerette must be maintained so closely. Our invention provides a convenient and expeditious manner of doing this without the necessity of the complicated and expensive electrical controls of the prior art. Furthermore, we are not depending to as large an extent as is the prior art upon the maintenance of the temperature in the common body of molten glass 30. We have been able to maintain a temperature differential between the spinnerette and the body of molten glass of one hundred degrees and operate successfully. Furthermore, it will readily be appreciated that different batches of glass have different softening and melting points and different operating temperatures depending on the composition of the glass. The composition controls the viscosity of the molten glass at a particular temperature. There are fast setting and slow setting glasses. The spinnerette temperature is determined by the composition of the glass, the size of the spinnerette orifices and the speed of attenuation. We can control this temperature very closely within predetermined limits once the variables have been determined.

It will also be observed that our spinnerette plates need not be arranged to have the structural strength required to support a large and heavy head of molten glass. This is a marked structural advantage in the building of spinning boxes.

Furthermore, owing to the close control of the temperature which we can achieve, we may use high-melting nickel chrome alloys for the spinnerette plate instead of expensive platinum which is customarily employed. Glass will wet nickel chrome alloys and hence we must use larger orifices in our spinnerette.

A control electrode 69 is positioned within the glass melting pot 10. This electrode governs the level of the body of molten glass 30. The level of the glass is maintained by feeding glass batch 71 to the melting pot from a feeder (not described since it is known in the art). This feeder may readily be controlled by the electrode 69 as is known in the art. When the level of the glass drops, the feeder is actuated and batch is fed to the glass pot through the opening 73. When the level of the glass reaches the electrode 69 the feeder is caused to stop the feeding operation.

The bridge wall 20 within the furnace is provided with openings 75 adjacent the bottom of the wall. This insures the glass will rise through the well 77 and in so doing it must describe a circuitous pathway. The slag and impurities which float will thus be stopped by the bridge wall. Heavy impurities which sink will be trapped in the well 77. In this manner the thin layer of glass 80 which flows from the body of molten glass 30 to cover the spinnerette will be free of impurities. It will be observed that the roof 18 over the melting chamber is provided with a plurality of re-entrant surfaces 82 similar to the surfaces 46. Burners 84 and 86 are positioned over the melting section of the furnace and these are adapted to heat the surfaces 82 to incandescence so that the glass will be melted by radiant heat and be maintained in a molten condition. Gas is fed to the burners 84 from a manifold 88 through branch pipes 90 and controlled by manual valves 92. The temperature of the molten glass is not too critical and may vary over comparatively wide limits as compared with the necessity of maintaining close temperature control of the spinnerette. Accordingly, thermocouple controlled valves are not necessary over the melting pot. In a similar manner burners 86 are supplied with gas from a manifold 94 through branch pipes 96 controlled by manual valves 98. The manifold 88 is supplied with a combustible fuel-air mixture through a pipe 100 and manifold 94 is supplied with a fuel-air mixture through pipe 102. A third manifold 104 is supplied with a fuel-air mixture through pipe 106. The manifold 104 feeds burners 108 through branch pipes 110 which are controlled by valves 112. The function of the burners 108 is to maintain the temperature of the molten glass 80 flowing from the body 30 to the glass layer 32 on top of the spinnerette 34. Once the conditions are set for an operation, the process may be continuously conducted.

We have not described nor shown the manner of drawing the fibers through the orifices 48 of the spinnerette by attenuating means since this process is well known to the art. Any appropriate attenuating means may be employed. It will be observed that the independent heating of the spinnerette by radiant heat and the independent heating of the melting pot by radiant heat enables us to raise or lower the spinnerette temperature about one hundred degrees without changing the glass temperature of the body of glass 30. It will also be observed that we can control the spinnerette temperature to some degree by raising and lowering the level of the body of glass 30 within the melting portion of our furnace. The greater depth of glass upon the spinnerette reduces the temperature of the spinnerette plate for a given condition of firing. We can aid the control of the temperature of the spinnerette plate by the decolorizing of the glass. The major control, however, is effected by controlling the valves 58 supplying the burners 44 which, in turn, heat the surfaces 46 to incandescence and thus cause these surfaces to act as heat radiators for heating the spinnerette 34. The control is automatically achieved by means of thermocouples 50, there being one thermocouple for each radiant heater.

It will be seen that we have accomplished the objects of our invention. We have provided a novel method of heating glass and spinnerettes for the production of glass filaments or fibers which eliminates electrical heating. In this manner we can obviate the use of costly equipment and controls and reduce materially the cost of operation. We have provided a novel mode of heating spinnerettes by radiant heat in the manufacture of glass fibers or filaments. We maintain the temperature of the spinnerette by regulating the supply of the mixture of air and gas. The valves 58 which are under the control of the solenoids 63 are adapted to occupy a low-heat position which reduces the supply of fuel-air to the burners or a high-heat position in which an increased supply of fuel-air mixture is allowed to pass to the burners. The intermittent control of the fuel-air mixture to a high- or low-heat position will integrate the radiant heat very closely over a period of time. During the operation the body of glass on the spinnerette is maintained at a constant level except, of course, when we wish to control the spinnerette temperature by varying the level of the body of glass 30 within the melting portion of the furnace to control the spinnerette temperature. We are enabled to employ a spinnerette of any desired length and having any desired cross-sectional shape. We can, accordingly, manufacture a greater plurality of fibers at a single time from a single melting furnace or pot and thus insure greater uniformity not only of composition but also of physical properties and dimensions of the finished fibers. Our process is such that it is much more economical owing to the savings made in the cost of heating the spinnerette.

It will be understood that certain features and subcombinations are of utility and may be employed without reference to other features and subcombinations. This is contemplated by and is within the scope of our claims. It is further obvious that various changes may be made in details within the scope of our claim without departing from the spirit of our invention. It is therefore to be understood that our invention is not to be limited to the specific details shown and described.

Having thus described our invention, what we claim is:

A method of spinning glass fibers including the steps of flowing molten glass over a spinnerette, maintaining the glass at a temperature to maintain the glass in molten condition by subjecting it to the action of radiant heat, heating the spinnerette substantially solely by passing radiant heat through said molten glass, decolorizing the glass to make it more transparent to infrared rays whereby more readily to heat the spinnerette by radiant heat passing through the molten glass and drawing the molten glass through the spinnerette orifices to form glass fibers.

References Cited in the file of this patent

UNITED STATES PATENTS

| | | |
|---|---|---|
| 2,133,236 | Slayter et al. | Oct. 11, 1938 |
| 2,150,945 | Slayter | Mar. 21, 1939 |
| 2,257,767 | Slayter et al. | Oct. 7, 1941 |
| 2,267,019 | Esser | Dec. 23, 1941 |
| 2,440,187 | Silverberg | Apr. 20, 1948 |
| 2,453,864 | Schlehr | Nov. 16, 1948 |
| 2,482,698 | Tillyer | Sept. 20, 1949 |
| 2,539,145 | Light | Jan. 23, 1951 |
| 2,618,906 | Hess | Nov. 25, 1952 |

FOREIGN PATENTS

| | | |
|---|---|---|
| 1,017,302 | France | Sept. 17, 1952 |
| 689,297 | Great Britain | Mar. 25, 1953 |